C. E. MILLS.
DIFFERENTIAL GEAR STRUCTURE.
APPLICATION FILED FEB. 4, 1920.
1,409,389.
Patented Mar. 14, 1922.
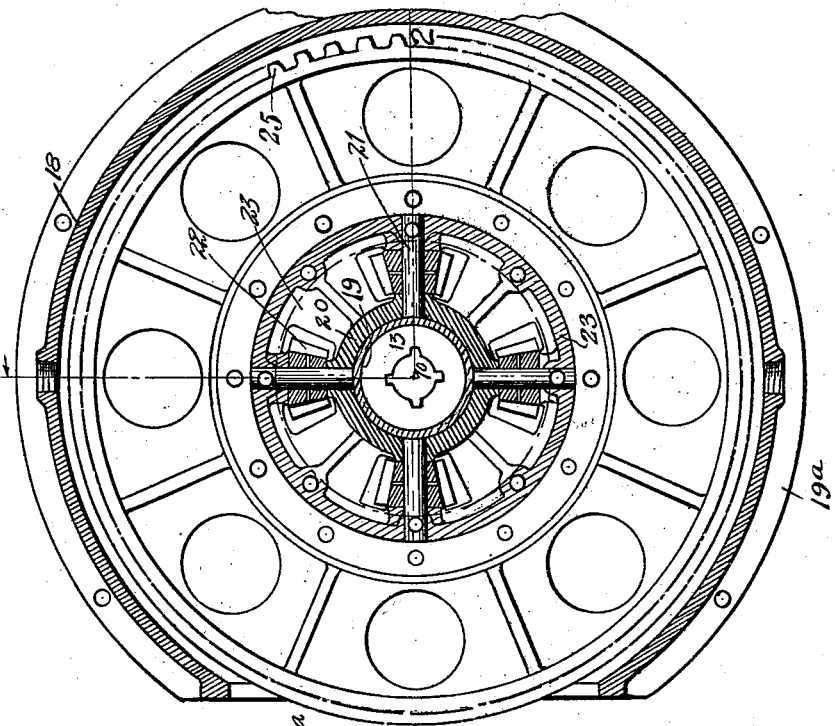
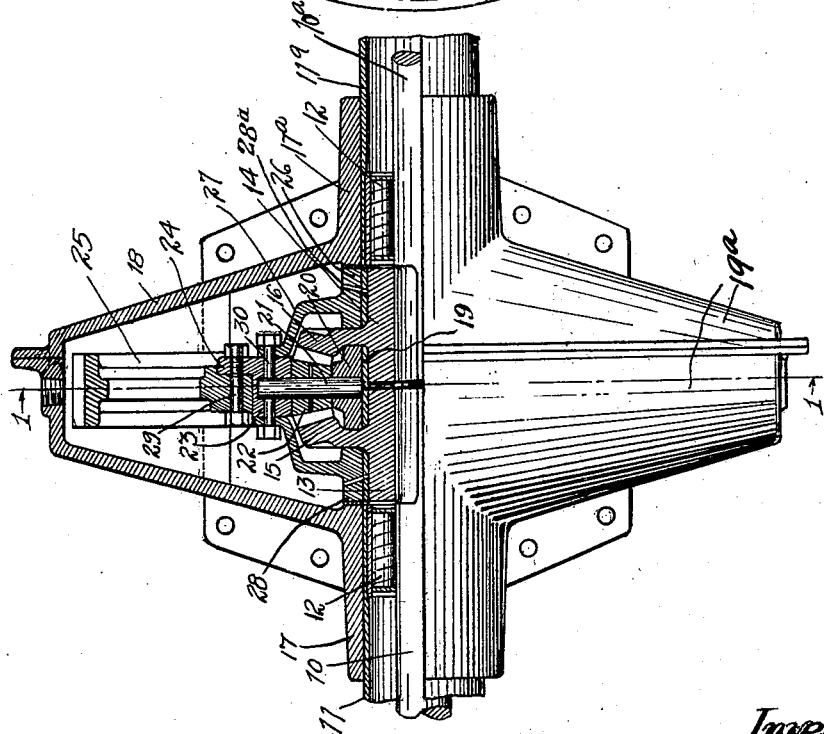

UNITED STATES PATENT OFFICE.

CLAUD E. MILLS, OF DES MOINES, IOWA.

DIFFERENTIAL-GEAR STRUCTURE.

1,409,389.　　　　　　　Specification of Letters Patent.　　Patented Mar. 14, 1922.

Application filed February 4, 1920. Serial No. 356,180.

*To all whom it may concern:*

Be it known that I, CLAUD E. MILLS, a citizen of the United States, and a resident of Des Moines, in the county of Polk and State of Iowa, have invented a certain new and useful Differential-Gear Structure, of which the following is a specification.

The object of my invention is to provide a differential gear of novel structure, having parts of simple construction, so made and arranged that they may be readily and easily assembled or taken apart for purposes of repair, replacement and storage.

With these and other objects in view my invention consists in the construction, arrangement and combination of the various parts of the device, whereby the objects contemplated are attained, as hereinafter more fully set forth, pointed out in my claim, and illustrated in the accompanying drawings, in which:

Figure 1 shows a vertical, sectional view taken through a reverse gear structure embodying my invention.

Figure 2 shows a front elevation of the same, partly in vertical section.

In the accompanying drawings, I have shown an axle comprising two aligned members, indicated by the reference characters 10 and $10^a$. Receiving the axle members 10 and $10^a$ respectively are sleeves or housing members 11 and $11^a$. Between the respective sleeves and axle members are roller bearings 12. The sleeves and roller bearings, just described, terminate short of the inner ends of the axle members. Mounted upon the adjacent ends of the axle members 10 and $10^a$ respectively are gear hubs 13 and 14, which form the hubs of spaced beveled gears 15 and 16.

The hubs or sleeves 13 and 14 are splined on the shaft members 10 and $10^a$. Mounted on the sleeves 11 and $11^a$ are the journal members 17 and $17^a$ of a two-part differential gear casing 18. Mounted on the inner ends of the hubs 13 and 14 between the gears 15 and 16 are bushings 19. Mounted on the bushings 19 is a sleeve 20. Mounted in the sleeve 20 are the inner ends of a series of short shafts 21, extending radially outwardly from the sleeve 20.

Mounted on the shafts 21 are beveled gears 22. The sleeve 20 forms part of a disk or spider 23, in the outer portion of which are received the outer ends of the shafts 21. The disk or spider 23, has at its periphery an annular outwardly extending flange 24, which is bolted to a large pinion or bull gear 25.

It will thus be seen the spider 23 with its sleeve portion 20 forms the inner part of the gear 25. Mounted on the outer ends of the sleeves 13 and 14 are bushings 26. Bolted to the outer portion of the spider 23 on opposite sides thereof are side brace members 27, the inner ends of which form bushings or bearings 28 journaled on the members 15 and 18 and having oil holes $28^a$. The gears 15 and 16 mesh with the gears 22. It will be seen that the construction of the differential gear mechanism herein set forth is such as to give a firm and sufficiently long bearing for the sleeve members 20 and 28, which serve as the hub of the gear 25, which is thus journaled on the hubs 13 and 14 of the gears 15 and 16.

It will be seen that the two parts of the casing $19^a$ may be separated, and thereafter the gearing structure may be readily and easily disassembled and reassembled for any desired purpose. After the casing members have been separated and slid longitudinally on the sleeves 11 and $11^a$, the outer part of the gear 25 may be readily taken off by removing the bolts 29; thereafter by removing the bolts 30, which extend through the outer portions of the members 27 and the spider 23, the brace members 27 may be removed. Thereafter the entire structure may be readily and easily taken apart. The parts of the structure which endure the most wear may be thus easily taken off and replaced.

Some changes may be made in the construction and arrangement of the various parts of my improved differential gear structure, without departing from the essential purposes and features of my invention, and it is my intention to cover by my claim any modified forms of structure or use of mechanical equivalents which may be reasonably included within their scope.

I claim as my invention:

In a differential gear structure, aligned shaft members, spaced bevelled gears having hubs fixed on the adjacent ends thereof, a sleeve on said hubs between said gears, an annular member spaced from and surrounding said sleeve, radially arranged trunnions seated in said sleeve and said member, gears on said shafts meshing with said first gears, braces bolted to said annular member and having hubs mounted on said first hubs outside said gears, said annular member having an annular radially extending flange, a gear bolted to said flange, a two-part gear casing enclosing said mechanism, said second described hubs abutting against said first bevelled gear on one side and said casing on the other side.

Des Moines, Iowa, June 27, 1919.

CLAUD E. MILLS.